US008884815B2

(12) United States Patent
Gritz et al.

(10) Patent No.: US 8,884,815 B2
(45) Date of Patent: Nov. 11, 2014

(54) ANTENNA-COUPLED IMAGER HAVING PIXELS WITH INTEGRATED LENSLETS

(75) Inventors: Michael A. Gritz, Goleta, CA (US); Robert F. Burkholder, Goleta, CA (US); Stephen H. Black, Buellton, CA (US); Borys Pawel Kolasa, Santa Barbara, CA (US)

(73) Assignee: Ratheon Company, Waltham, MA (US)

( * ) Notice: Subject to any disclaimer, the term of this patent is extended or adjusted under 35 U.S.C. 154(b) by 341 days.

(21) Appl. No.: 13/189,233

(22) Filed: Jul. 22, 2011

(65) Prior Publication Data

US 2013/0021203 A1 Jan. 24, 2013

(51) Int. Cl.

| | |
|---|---|
| ***G01S 3/02*** | (2006.01) |
| ***G01S 5/02*** | (2010.01) |
| ***G02B 3/00*** | (2006.01) |
| ***H01Q 19/09*** | (2006.01) |
| ***H01Q 21/22*** | (2006.01) |
| ***H01Q 21/06*** | (2006.01) |
| ***H01Q 19/06*** | (2006.01) |

(52) U.S. Cl.

CPC ............. *H01Q 19/09* (2013.01); *H01Q 21/225* (2013.01); *H01Q 21/061* (2013.01); *H01Q 19/062* (2013.01)

USPC ............................ 342/351; 342/369; 359/664

(58) Field of Classification Search

USPC .......... 342/351, 368, 369, 371; 359/455, 457, 359/619, 664

See application file for complete search history.

(56) References Cited

U.S. PATENT DOCUMENTS

| | | | | |
|---|---|---|---|---|
| 4,063,246 | A | 12/1977 | Greiser | |
| 5,677,697 | A * | 10/1997 | Lee et al. | 342/368 |
| 6,441,368 | B1 | 8/2002 | Grinberg et al. | |
| 6,788,460 | B2 * | 9/2004 | Knox et al. | 359/456 |
| 7,095,027 | B1 | 8/2006 | Boreman et al. | |
| 7,456,803 | B1 * | 11/2008 | Sievenpiper | 343/909 |
| 7,679,057 | B2 | 3/2010 | Gritz et al. | |
| 2002/0130831 | A1 * | 9/2002 | Engler et al. | 345/107 |
| 2003/0011528 | A1 | 1/2003 | Marchand | |
| 2007/0001895 | A1 | 1/2007 | Kolinko et al. | |
| 2008/0073600 | A1 * | 3/2008 | Appleby et al. | 250/505.1 |
| 2009/0065583 | A1 * | 3/2009 | McGrew | 235/454 |
| 2009/0108202 | A1 | 4/2009 | Gritz et al. | |
| 2013/0050015 | A1 | 2/2013 | Black et al. | |

OTHER PUBLICATIONS

Jamaluddin, M. H., et al.; Microstrip Dipole Antenna Analysis with Different Width and Length at 2.4 GHz; Asia-Pacific Conference on Applied Electromagnetics Proceedings; pp. 41-44, Dec. 20-21, 2005.
Anderson, Conrad, et al.; "A 24x28 Bolometer-Based Passive Millimeter Wave Imager," Department of Defense, Microsystems Technology Office; 10 pages, Mar. 25, 2002.

(Continued)

*Primary Examiner* — Dao Phan

(74) *Attorney, Agent, or Firm* — Lando & Anastasi, LLP

(57) ABSTRACT

According one embodiment, a millimeter-wave radiation imaging array includes a plurality of antenna elements configured to receive millimeter-wave radiative input. Each lenslet of a plurality of lenslets are coupled to one of the plurality of antenna elements such that no air exists between each lenslet and the one of the plurality of antenna elements. Each lenslet has a spherical portion being operable to direct the radiative input towards the one of the plurality of antenna elements. An energy detector is coupled to the plurality of antenna elements opposite the plurality of lenslets and operable to measure the radiative input received by the plurality of antenna elements.

18 Claims, 2 Drawing Sheets

(56) References Cited

OTHER PUBLICATIONS

Greiser, John W.; "Coplanar Stripline Antenna," Transco Products, Inc. Venice, CA; pp. 47-49, Oct. 1976.

Ehmouda, J. et al.; "Steered Microstrip Phased Array Antennas," World Academy of Science, pp. 319-323, 2009.

Hrubesh, Lawrence W. et al.;"Thin Aerogel Films for Optical, Thermal, Acoustic, and Electronic Applications," Lawrence Livermore National Laboratory, 16 pages, Nov. 17, 1995.

Gonzalez, F. J. et al; "Two Dimensional Array of Antenna-Coupled Microbolometers," International Journal of Infrared and Millimeter Waves, pp. 785-797, 2002.

Wilke, I.; Oppliger, Y.; Hermann, W.; and Kneubuhl, F.K.; Nanometer Thin-Film Ni—NiO—Ni Diodes for 30 THz Radiation,: Applied Physics A Solids and Surfaces, pp. 329-341, 1994.

Wilke, I.;; Hermann, W.; and Kneubuhl, F.K.; Integrated Nanostrip Dipole Antennas for Coherent 30 THz Infrared Radiation,: Applied Physics B Lasers and Optics, pp. 87-95, 1994.

Gritz, Michael A.; Gonzalez, Javier;Boreman, Glenn; "Fabrication of Infrared Antennas using Electron Beam Lithography," Micomachining Technology for Micro-optics and and Nano-optics, pp. 100-110, 2003.

Codreanu, L and Boreman, G; Influence of Dielectric Substrate on the Responsivity of Microstrip Dipole-Antenna-Coupled Infrared Microbolometers; Applied Optics, pp. 1835-1840, Apr. 1, 2002.

MacDonald, M; and Grossman, E; "Niobium Microbolometers for Far-Infrared Detection," IEEE Transactions on Microwave Theory and Techniques, vol. 43, No. 4, pp. 893-898, Apr. 1995.

Pierret, Robert; "Semiconductor Device Fundamentals," School of Electrical and Computer Engineering, Purdue University, published by Addison-Wesley, pp. 563-609, 1996.

Balanis, Constantine; "Antenna Theory, Analysis and Design, second edition," John Wiley & Sons, Inc., pp. 722-784, 1997.

Gritz, M.; Puscasu, I.; Spencer, D.; Boreman, G.; "Fabircation of an Infrared Antenna-Coupled Microbolometer Linear Array Using Chrome as a Mask," American Vacuum Society, pp. 2608-2611, 2003.

Declaration of Dr. Michael A. Gritz regarding JIEDDO; 14 pages, Jun. 6, 2011.

Koert, P. et al., "Millimeter Wave Technology for Space Power Beaming", IEEE Transactions on Microwave Theory and Techniques, IEEE Service Center, vol. 40, No. 6, Jun. 1, 1992, pp. 1251-1258.

McSpadden, J. O. et al., "Theoretical and Experimental Investigation of a Rectenna Element for Microwave Power Transmission", IEEE Transactions on Microwave Theory and Techniques, IEEE Service Center, vol. 40, No. 12, Dec. 1, 1992, pp. 2359-2366.

* cited by examiner

ANTENNA-COUPLED IMAGER HAVING PIXELS WITH INTEGRATED LENSLETS

TECHNICAL FIELD

This invention relates generally to antenna systems, and more particularly, to antenna-coupled imagers having pixels with integrated lenslets.

BACKGROUND OF THE INVENTION

Imagers may use antennas to detect electromagnetic radiation. Imagers may be useful for many applications, including scientific equipment, surveillance equipment, targeting equipment, and military applications. One example of an imager that uses antennas to detect electromagnetic radiation is a millimeter wave imager. Millimeter wave imagers may be used, for example, as whole body imaging devices for detecting objects concealed underneath a person's clothing.

SUMMARY OF THE INVENTION

According one embodiment, a millimeter-wave radiation imaging array includes a plurality of antenna elements configured to receive millimeter-wave radiative input. Each lenslet of a plurality of lenslets are coupled to one of the plurality of antenna elements such that no air exists between each lenslet and the one of the plurality of antenna elements. Each lenslet has a spherical portion being operable to direct the radiative input towards the one of the plurality of antenna elements. An energy detector is coupled to the plurality of antenna elements opposite the plurality of lenslets and operable to measure the radiative input received by the plurality of antenna elements.

Particular embodiments of the present disclosure may provide one or more technical advantages. A technical advantage of one embodiment may include increased imager sensitivity. For example, an array of pixels may be provided that allows for a larger collection area and increased imager sensitivity. A technical advantage of one embodiment may also include improved collection efficiency. For example, lenslets may be integrated with a pixel's antenna element to direct electromagnetic radiation to the antenna element. A technical advantage of one embodiment may also include impedance matching between the pixel and the received electromagnetic radiation.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

It should be understood at the outset that, although example implementations of embodiments are illustrated below, various embodiments may be implemented using a number of techniques, whether currently known or not. The present disclosure should in no way be limited to the example implementations, drawings, and techniques illustrated below.

Imagers may use multiple antennas to detect electromagnetic radiation. For example, imagers may use multiple pixels, with each pixel including at least one antenna. Teachings of certain embodiments recognize that using multiple pixels in an imager may increase imager sensitivity by increasing the collection area of the imager.

In this example, each pixel may have a particular antenna pattern. Teachings of certain embodiments recognize that a lenslet may be provided for each pixel to help shape the antenna pattern and improve collection efficiency. For example, a lenslet may be integrated with a pixel's antenna element to direct electromagnetic radiation to the antenna element. Teachings of certain embodiments also recognize that a lenslet may provide impedance matching to a targeted wavelength of the electromagnetic radiation.

Figure 1:
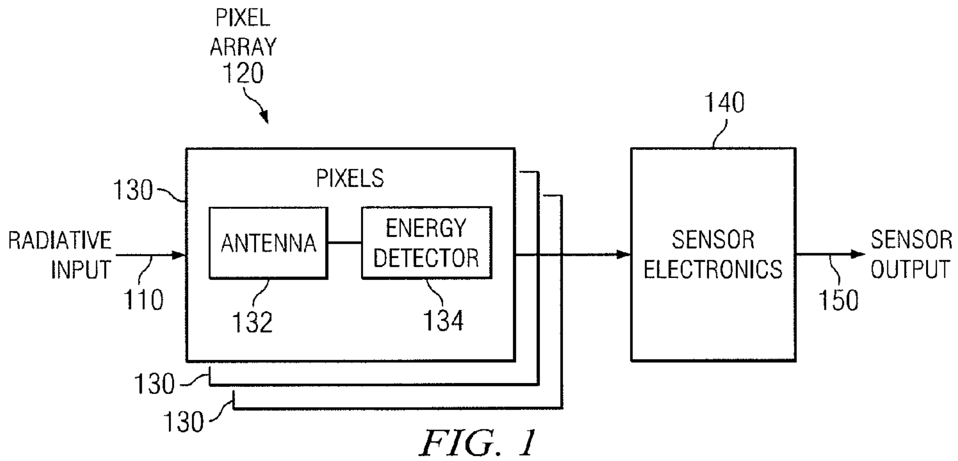
FIG. 1 is a block diagram of an imager according to one embodiment.

FIG. 1 is a block diagram of an imager 100 according to one embodiment. Imager 100 may receive a radiative input 110 and produce a sensor output 150. Radiative input 110 includes any electromagnetic signals, including, but not limited to, radio-frequency, optical, infrared, or microwave signals. Imager 100 generates sensor output 150 based on the received radiative input 110. This sensor output 150 may be used, for example, by an imaging system to generate an image based on the radiative input 110.

In the illustrated embodiment, imager 100 includes an antenna array 120 and sensor electronics 140. Antenna array 120 may include one or more pixels 130. Each pixel 130 may include an antenna element 132 and an energy detector 134.

Antenna element 132 may include any non-heterodyne antenna element. Non-heterodyne antennas may use direct-detection techniques that allow for smaller and/or lighter detection systems. In a direct-detection system, the received signal is directly converted to the baseband signal without the use of a local oscillator.

Examples of energy detector 134 may include any device operable to measure detected radiative input 110. Examples of energy detector 134 may include, but are not limited to rectifiers and photodetectors. An example of a rectifier may include a diode rectifier, such as a Schottky diode. Photodetectors may include photovoltaic, photoconductive, and pyroelectric detectors. Examples of photodetectors may include bolometers and bandgap or semiconductor detectors. A bolometer may operate by sensing the increase in temperature as energy is absorbed. An exemplary bandgap or semiconductor detector operates by generating an electron current or a change in its electrical resistance in proportion to the infrared flux it receives. Materials such as mercury cadmium telluride and indium antimonide may have this characteristic. In both examples, a photodetector may be connected to microstrip feed lines from multiple antenna elements instead of directly to a single antenna element.

In some embodiments, imager 100 may also include sensor electronics 140. Sensor electronics 140 may include any device operable to receive measurements from energy detector 134 and produce sensor output 150. Sensor electronics 140 may include, but are not limited to, preamplifier, gain & level correction, multiplexer, and analog-to-digital conversion circuits. In some embodiments, sensor electronics 140 may be incorporated into an integrated circuit coupled to or within a substrate.

Figure 2:
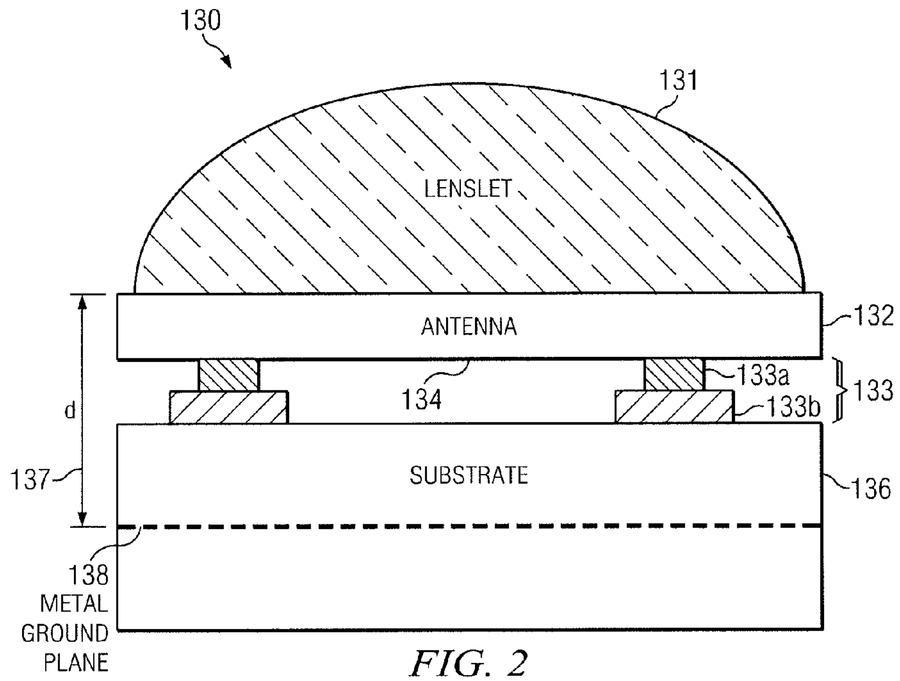
FIG. 2 shows an example pixel of the imager of FIG. 1 according to one embodiment.

FIG. 2 shows an example pixel 130 of FIG. 1 according to one embodiment. In this example, pixel 130 includes a lenslet 131, antenna element 132, support elements 133, energy detector 134, substrate 136, and ground plane 138.

Lenslet 131 directs radiative input 110 towards antenna element 132. In some embodiments, lenslet 131 is a refractive lens that refracts radiative input 110 towards antenna element 132. In some embodiments, lenslet 131 is in the shape of a sphere or partial sphere, such as a hemisphere as shown in FIG. 2.

Lenslet 131 may be made of any suitable material. In some embodiments, lenslet 131 is made of a dielectric material. Example materials of lenslet 131 may include, but are not limited to, semiconductors (e.g., silicon, gallium arsenide, germanium); polymers (e.g., carbon-doped polymers); epoxies and epoxy laminates; and ceramics.

In some embodiments, lenslet 131 provides impedance matching to a targeted wavelength of the electromagnetic radiation. For example, in some embodiments, lenslet 131 may have a impedence-matching coating configured to a particular wavelength of radiation. The impedence-matching coating reduces reflections of radiation traveling at the particular wavelength. For example, a millimeter wave imager may have pixels with a selective coating that reduces reflections of millimeter wave radiation and maximizes transfer of millimeter wave radiation to the antenna element.

In the example of FIG. 2, lenslet 131 is coupled to antenna element 132 such that no air exists between lenslet 131 and antenna element 132. Teachings of certain embodiments recognize that eliminating air between lenslet 131 and antenna element 132 improves collection efficiency. If there is an air gap between lenslet 131 and antenna element 132, for example, the antenna pattern may degrade and the enhancement factor provided by lenslet 131 may be lost. Teachings of certain embodiments also recognize that providing individual lenslets 131 for each pixel provides an efficient mechanism for coupling lenslets 131 to antenna element 132 such that no air exists between lenslet 131 and antenna element 132. By providing a lenslet 131 for each pixel, the pixels may be handled as individual units even if lenslets 131 are permanently attached to antenna elements 132.

In some embodiments, lenslets 131 and antenna elements 132 are made from the same material. For example, in some embodiments, lenslets 131 and antenna elements 132 may be made from the same semiconductor, polymer, epoxy, or ceramic material. In some embodiments, lenslets 131 and antenna elements 132 may be manufactured together during the same process as an integrated unit. For example, a silicon material may include both a refractive portion representing lenslet 131 and a uniform portion representing antenna element 132.

In some embodiments, lenslets 131 and/or antenna elements 132 may be manufactured in sheets of adjacent pixels. For example, in some embodiments, lenslets 131 may be coupled to antenna elements 132 using ink printing or spraying techniques, such as photolithography. In some embodiments, lenslets 131 may be attached to antenna elements 132 using form-factor materials such as foams, polymers, plastics, or composites. In some embodiments, lenslets 131 may be attached to antenna elements 132 using a mechanical connection.

In the example of FIG. 2, energy detector 134 is coupled to antenna element 132. In some embodiments, energy detector 134 may be fabricated directly onto antenna element 132. In some embodiments, energy detector 134 may be bonded onto antenna element 132 after fabrication, such as by using an epoxy or adhesive.

Support elements 133 couple antenna element 132 to substrate 136. In the example of FIG. 2, support elements 133 include an attach pad 133*a* and a substrate attach pad 133*b*. In this example, attach pad 133*a* provides mechanical support to antenna element 132, and substrate attach pad 133*b* provides an attachment point for attach pad 133*a* to couple to substrate 136.

Examples of support elements 133 may include a variety of different materials and structures including, but not limited to, a conductive adhesive; mechanical contacts; metallic cold-welds, which may be formed using a metal such as indium or an alloy thereof; solder connections; socket connections; and pressure contacts. In some embodiments, support elements 133 may provide an electrical coupling as well as a mechanical coupling between antenna element 132 and substrate 136. In FIG. 2, for example, two sets of support elements 133 are provided to allow for two electrical connections between antenna element 132 and substrate 136 so as to close a circuit.

In one example embodiment, support elements 133 may be sized so as to maintain a distance between antenna elements 132 and ground plane 138 equal to approximately one quarter of the center wavelength of antenna elements 132. As one example, antenna array 120 may be used in a millimeter wave imager which may be configured to detect signals with wavelengths between one and ten millimeters. Such millimeter wave imagers may be used, for example, as whole body imaging devices used for detecting objects concealed underneath a person's clothing. In the millimeter wave imaging example, support elements 133 may maintain antenna elements 132 between 250 and 2500 microns from the ground plane of substrate 136. In one example embodiment, antenna elements 132 may be maintained 500 microns from the ground plane of substrate 136.

Substrate 136 may include any material suitable for providing physical support to antenna element 132. In one example embodiment, substrate 136 is a printed circuit board. In some embodiments, substrate 136 is made from a dielectric material. Examples of materials for substrate 136 may include, but are not limited to, ceramic, polymer, polyamide, fluorocarbon, and epoxy laminate material.

In some embodiments, substrate 136 may include ground plane 138. Ground plane 138 may act as a near-field reflection point for energy detector 134. For example, in some embodiments, lenslet 131 and antenna element 132 may be made from a material translucent to incoming radiative input 110. In this example, some portion of the radiative input 110 may be detected by energy detector 136. In this example, however, not all of the radiative input 110 will be detected by energy detector 136. Instead, some of the radiative input 110 may pass through lenslet 131 and antenna element 132, reflect off of ground plane 138, and be detected by energy detector 136. Thus, providing ground plane 138 may provide energy detector 136 another mechanism for detecting radiative input 110.

In some embodiments, ground plane 138 may be separated from energy detector 134 by a distance 137. In some examples, distance 137 is equal to a quarter of the wavelength of the incoming radiative input 110. Teachings of certain embodiments recognize that radiative input 110 may be detected by energy detector 136 if reflected at a distance of one-quarter wavelength.

In some embodiments, ground plane 138 may be formed from a metallic layer, such as a gold or copper layer. For example, ground plane 138 may be formed from a gold-plated copper layer on a printed circuit board substrate 136. In some embodiments, the printed circuit board substrate 136 may have openings for each antenna element 132 to electrically connect to the ground plane 138.

Figure 3:
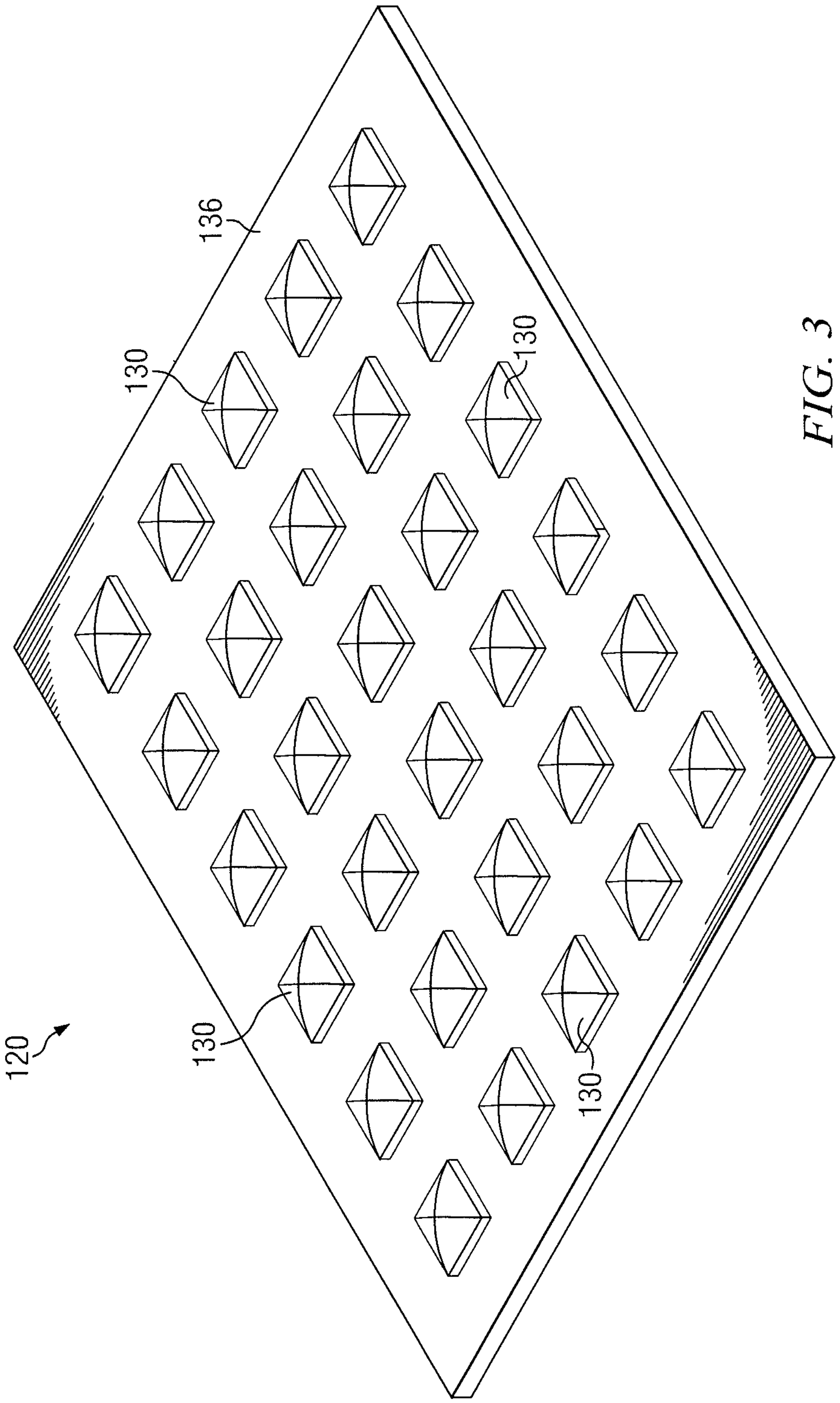
FIG. 3 shows a perspective view of an example antenna array of the imager of FIG. 1 according to one embodiment.

FIG. 3 shows a perspective view of an example antenna array 120 of FIG. 1 according to one embodiment. In this example, antenna array 120 includes a two-dimensional array of pixels 130. In an example embodiment, pixels 130 may be approximately two millimeters wide and separated from each other by a distance of two millimeters or less. In one embodiment, pixels 130 are positioned adjacent to one another with no space between them.

In the example of FIG. 3, substrate 136 is a planar substrate supporting a two-dimensional array of pixels 130. In some embodiments, substrate 136 may be a curved substrate supporting a two-dimensional array of pixels 130. For example, in some embodiments, substrate 136 may be configured to curve around a column to provide radiation detection in a near 360 degree field of view.

In some embodiments, substrate 136 is comprised of a rigid material. In other embodiments, substrate 136 is comprised of a flexible material, such as a flexible printed wiring board, that allows the curvature of substrate 136 to be changed without cracking substrate 136. Teachings of certain embodiments recognize that manufacturing substrate 136 from a flexible material may allow substrate 136 to adapt to a variety of environments. As one example, a flexible substrate 136 may be wrapped around a variety of columns regardless of the curvature and/or diameter of the column.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

What is claimed is:

1. A millimeter-wave radiation imaging array, comprising:

a plurality of antenna elements operable to receive millimeter-wave radiative input;

a plurality of lenslets, each lenslet being coupled to one of the plurality of antenna elements such that no air exists between each lenslet and the one of the plurality of antenna elements, each lenslet having a spherical portion being operable to direct the radiative input towards the one of the plurality of antenna elements; and an energy detector coupled to the plurality of antenna elements opposite the plurality of lenslets and operable to measure the radiative input received by the plurality of antenna elements.

2. A radiation imager, comprising:

a plurality of antenna elements configured to receive radiative input;

a plurality of lenslets, each lenslet being coupled to one of the plurality of antenna elements, each lenslet including a spherical portion operable to direct the radiative input towards the one of the plurality of antenna elements; and an energy detector operable to measure the radiative input received by the plurality of antenna elements.

3. The radiation imager of claim 2, wherein each lenslet is coupled to one of the plurality of antenna elements such that no air exists between the lenslet and the antenna element.

4. The radiation imager of claim 2, wherein each lenslet of the plurality of lenslets has a hemisphere shape comprising the spherical portion and a flat end opposite the spherical portion, the flat end being coupled to one of the plurality of antenna elements.

5. The radiation imager of claim 2, further comprising:

a substrate; and a plurality of support elements, each support element of the plurality of support elements mechanically coupling an antenna element of the plurality antenna elements to the substrate.

6. The radiation imager of claim 5, the substrate having a ground plane layer, the plurality of support elements providing substantially-uniform spacing between each antenna element and the ground plane layer.

7. The radiation imager of claim 5, wherein the substrate is non-planar.

8. The radiation imager of claim 2, wherein the energy detector comprises a rectifier circuit.

9. The radiation imager of claim 2, wherein the energy detector comprises a photodetector element.

10. The radiation imager of claim 2, wherein the plurality of antenna elements and the plurality of lenslets are comprised of the same material.

11. The radiation imager of claim 2, further comprising a impedance-matching coating covering each lenslet of the plurality of lenslets.

12. The radiation imager of claim 2, wherein the energy detector is coupled to the plurality of antenna elements opposite the plurality of lenslets.

13. A radiation imager pixel, comprising:

an antenna element configured to receive radiative input; and a lenslet coupled to the antenna element, the lenslet being operable to direct the radiative input towards the antenna element, the lenslet including a spherical portion operable to direct the radiative input towards the antenna element.

14. The radiation imager pixel of claim 13, wherein the lenslet is coupled to the antenna element such that no air exists between the lenslet and the antenna element.

15. The radiation imager pixel of claim 13, wherein the lenslet has a hemisphere shape comprising the spherical portion and a flat end opposite the spherical portion, the flat end being coupled to the antenna element.

16. The radiation imager pixel of claim 13, wherein the antenna element and the lenslet are comprised of the same material.

17. The radiation imager pixel of claim 13, further comprising an impedance-matching coating covering the lenslet.

18. The radiation imager pixel of claim 13, wherein the lenslet is comprised of a dielectric material.

* * * * *

UNITED STATES PATENT AND TRADEMARK OFFICE
CERTIFICATE OF CORRECTION

PATENT NO. : 8,884,815 B2
APPLICATION NO. : 13/189233
DATED : November 11, 2014
INVENTOR(S) : Gritz et al.

It is certified that error appears in the above-identified patent and that said Letters Patent is hereby corrected as shown below:

On the title page item (73), delete “Ratheon Company” and insert -- Raytheon Company --.

Signed and Sealed this
Third Day of March, 2015

Michelle K. Lee
*Deputy Director of the United States Patent and Trademark Office*